US009499947B2

(12) United States Patent
Röhr et al.

(10) Patent No.: US 9,499,947 B2
(45) Date of Patent: Nov. 22, 2016

(54) DRIVE SYSTEM, IN PARTICULAR FOR A SELF-PROPELLED CONSTRUCTION MACHINE, ESPECIALLY A SOIL COMPACTOR

(71) Applicant: Hamm AG, Tirschenreuth (DE)

(72) Inventors: Andreas Röhr, Weiden (DE); Thomas Henker, Tirschenreuth (DE); Ronny Pieske, Zwönitz (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 14/573,198

(22) Filed: Dec. 17, 2014

(65) Prior Publication Data

US 2015/0176227 A1 Jun. 25, 2015

(30) Foreign Application Priority Data

Dec. 20, 2013 (DE) .......................... 10 2013 227 007

(51) Int. Cl.
*E01C 19/00* (2006.01)
*E01C 19/28* (2006.01)
(Continued)

(52) U.S. Cl.
CPC ............... *E01C 19/286* (2013.01); *B60K 6/12* (2013.01); *E01C 19/23* (2013.01); *E01C 19/266* (2013.01); *F15B 1/024* (2013.01); *B60W 2300/17* (2013.01); *Y02T 10/6208* (2013.01)

(58) Field of Classification Search
CPC .... E01C 19/23; E01C 19/266; E01C 19/286; B60K 6/12; B60K 2300/17; F15B 1/024; Y02T 10/6208
USPC ................................... 404/83, 113, 117, 122
See application file for complete search history.

(56) References Cited

U.S. PATENT DOCUMENTS 4,759,659 A * 7/1988 Copie ...................... B06B 1/165
366/125
4,793,735 A * 12/1988 Paukert .................. E01C 19/286
180/20

(Continued)

FOREIGN PATENT DOCUMENTS

| CN | 1987124 A | 6/2007 |
|---|---|---|
| CN | 101068696 A | 11/2007 |

(Continued)

OTHER PUBLICATIONS

Search Report issued for German application No. 10 2013 227 007.0 dated Nov. 25, 2014, with machine English translation, 13 pages.

(Continued)

*Primary Examiner* — Raymond W Addie
(74) *Attorney, Agent, or Firm* — Rothwell, Figg, Ernst & Manbeck, P.C.

(57) ABSTRACT

A drive system, in particular for a self-propelled construction machine, especially a soil compactor, comprising a drive unit, at least one hydraulic circuit with a hydraulic pump drivable by the drive unit, as well as a hydraulic drive support unit with a hydraulic pump/motor assembly and at least one compressed fluid reservoir, wherein the hydraulic pump/motor assembly is, or can be, drivingly coupled to the drive unit and/or to at least one hydraulic circuit, wherein the hydraulic pump/motor assembly can be operated in a charging operating mode as a pump by means of the drive unit and/or by means of at least one hydraulic circuit for charging at least one compressed fluid reservoir, and which is drivable in a drive support state as a motor to provide a drive support torque for the hydraulic pump of at least one hydraulic circuit, is characterized in that a maximum drive torque provided by the drive unit is smaller than a maximum request torque to be applied for operating at least one hydraulic circuit.

18 Claims, 2 Drawing Sheets

Figure 1:
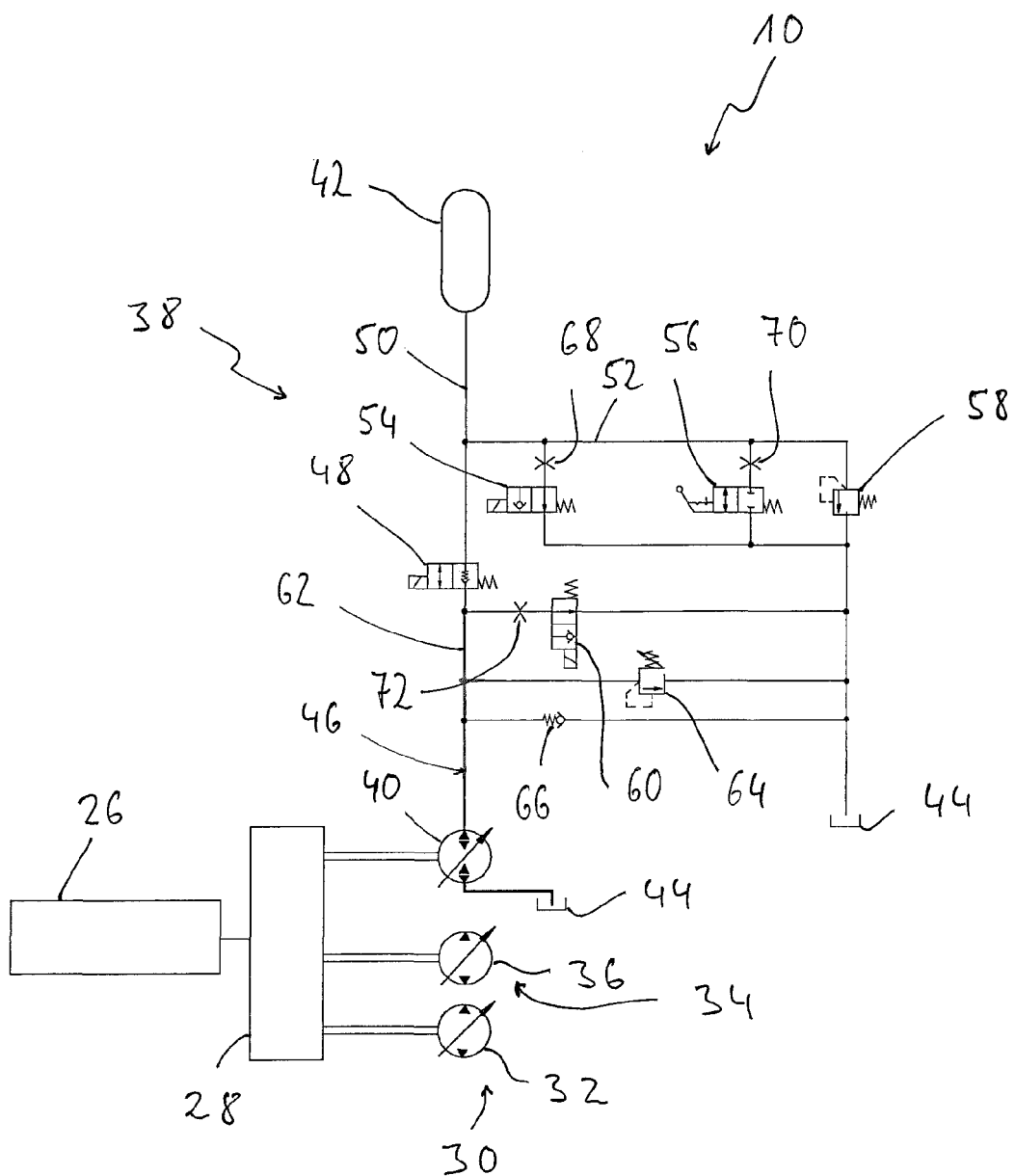

(51) Int. Cl.
*B60K 6/12* (2006.01)
*E01C 19/23* (2006.01)
*E01C 19/26* (2006.01)
*F15B 1/02* (2006.01)

(56) References Cited

U.S. PATENT DOCUMENTS

| | | | |
|---|---|---|---|
| 8,727,660 B2* | 5/2014 | Anderegg | E02D 3/074 404/117 |
| 2006/0079375 A1 | 4/2006 | Marshall et al. | |
| 2009/0241534 A1 | 10/2009 | Tikkanen et al. | |
| 2013/0125536 A1 | 5/2013 | Ho et al. | |
| 2013/0266373 A1 | 10/2013 | Pieske et al. | |

FOREIGN PATENT DOCUMENTS

| | | | | |
|---|---|---|---|---|
| CN | 103261523 A | | 8/2013 | |
| CN | 204476883 U | | 7/2015 | |
| DE | WO2011095200 | * | 12/2010 | B06B 1/16 |
| DE | 102010036817 A1 | | 3/2011 | |
| DE | WO2012080411 | * | 12/2011 | E01C 19/26 |
| DE | 102010063255 A1 | | 6/2012 | |
| DE | 102011104919 A1 | | 10/2012 | |
| EP | 1935697 A1 | | 6/2008 | |
| JP | S53-006776 A | | 1/1978 | |
| JP | H09-256421 A | | 9/1997 | |
| JP | 2005-279364 A | | 10/2005 | |
| JP | 2008-069538 A | | 3/2008 | |
| JP | 2010-121373 A | | 6/2010 | |
| WO | 2013074164 A1 | | 5/2013 | |

OTHER PUBLICATIONS

Search Report issued for European application No. 14193128.7 dated Jun. 16, 2015 with machine English translation (11 pages).
Office Action issued for Japanese Patent Application No. 2014-250693 dated Nov. 2, 2015, with machine English translation (19 pages).
Office Action and Search Report issued for Chinese Patent Application No. 20140778730.4 dated Jun. 14, 2016 (8 pages).

* cited by examiner

DRIVE SYSTEM, IN PARTICULAR FOR A SELF-PROPELLED CONSTRUCTION MACHINE, ESPECIALLY A SOIL COMPACTOR

CROSS REFERENCE TO RELATED APPLICATION(S)

This application claims priority to German Application No. 10 2013 227 007.0, filed Dec. 20, 2013. The entirety of the disclosure of the above-referenced application is incorporated herein by reference.

BACKGROUND OF THE INVENTION

Field of the Invention

The present invention relates to a drive system, in particular for a self-propelled construction machine, especially a soil compactor, comprising:
a drive unit,
at least one hydraulic circuit with a hydraulic pump drivable by the drive unit,
a hydraulic drive support unit with a hydraulic pump/motor assembly and at least one compressed fluid reservoir, wherein the hydraulic pump/motor assembly is, or can be, drivingly connected to the drive unit and/or to at least one hydraulic circuit, wherein the hydraulic pump/motor assembly is drivable in a charging operating mode as a pump by means of the drive unit and/or by means of at least one hydraulic circuit for charging at least one compressed fluid reservoir, and in a drive support state is drivable as a motor to provide a drive support torque for the hydraulic pump of at least one hydraulic circuit.

Background of the Related Art

A drive system of this kind is known from WO 2013/074164A1 as a drive system for a construction machine configured as a wheeled loader. In this known drive system, a drive unit is drivingly connected via a transmission arrangement to various hydraulic circuits. These hydraulic circuits comprise a hydraulic driving circuit with a hydraulic driving pump driven by the drive unit, and a hydraulic driving motor, which is driven by the flowing fluid when the hydraulic driving pump is operated, in order to drive the drive wheels of the wheeled loader. Furthermore, one or several hydraulic working circuits are provided. They also comprise a hydraulic working pump each, which is drivable by the drive unit via the transmission arrangement. By means of the hydraulic pressure generated by these pumps, piston/cylinder units can, for example, be activated in order to move a bucket of the wheeled loader when in operation. Furthermore, this drive system comprises a hydraulic drive support unit. Said unit comprises a hydraulic pump/motor assembly drivable by the drive unit via the transmission arrangement; said assembly charges a compressed fluid reservoir when the pump is operating, thus increasing the pressure of the fluid stored therein. The hydraulic pump/motor assembly of this hydraulic drive support unit can also be operated as a hydraulic motor in order to generate a torque by relieving the pressure in the compressed fluid reservoir, which torque can be transmitted via the transmission arrangement to the various hydraulic circuits, that is, to the hydraulic driving circuit and to the hydraulic working circuit or circuits. Thus, the hydraulic drive support unit can provide a drive support torque.

SUMMARY OF THE INVENTION

It is the object of the present invention is to provide a drive system, in particular for a self-propelled construction machine, especially a soil compactor, which permits a more efficient utilization of the available energy sources of the drive unit and hydraulic drive support unit.

According to the present invention, this object is attained by a drive system, in particular for a self-propelled construction machine, especially a soil compactor, comprising:
a drive unit,
at least one hydraulic circuit with a hydraulic pump drivable by the drive unit,
a hydraulic drive support unit with a hydraulic pump/motor assembly and at least one compressed fluid reservoir, wherein the hydraulic pump/motor assembly is, or can be, drivingly connected to the drive unit and/or to at least one hydraulic circuit, wherein the hydraulic pump/motor assembly is drivable in a charging operating mode as a pump by means of the drive unit and/or by means of at least one hydraulic circuit for charging at least one compressed fluid reservoir, and in a drive support state is drivable as a motor to provide a drive support torque for the hydraulic pump of at least one hydraulic circuit.

The invention further provides that a maximum drive torque that can be provided by the drive unit is smaller than a maximum request torque to be applied for operating at least one hydraulic circuit.

The drive system configured as a hybrid system according to the present invention is thus fundamentally designed such that the drive unit provided as a primary drive energy source is by itself not capable of supplying the torque required at maximum load, that is, the maximum request torque. Such a situation of comparatively high load can occur, for example, when a construction machine, e.g. a soil compactor, has to be moved for a short time along a path with a very steep gradient, or for example, when it has to be moved over a curbstone edge, or when supplementary units have to be put into operation. In these situations, in which the request torque exceeds the maximum torque that can be provided by a drive unit, and thus exceeds the maximum drive torque, by providing the drive support torque the hydraulic drive support unit can be used to generate a state in which the drive unit and the hydraulic drive support unit function in parallel, and thus provide a total drive torque which is sufficient to operate the machine equipped with the drive system according to the present invention in the desired operating mode even in such situations in which a comparatively large torque is required.

It is particularly advantageous, if a maximum total drive torque provided by the maximum drive torque and a maximum drive support torque provided by the hydraulic drive support unit are larger than or equal to the maximum request torque. It is thus ensured that even in the case of maximum peak requirements due to the simultaneous activation of the hydraulic drive support unit a sufficiently large total drive torque can be made available.

In particular when incorporating the drive system according to the present invention into a construction machine, such as a soil compactor, a wheeled loader or the like, it is proposed that at least one hydraulic circuit is provided as a hydraulic driving circuit for the traction drive, with a hydraulic driving pump drivable by the drive unit and/or by the hydraulic drive support unit, and/or at least one hydraulic working circuit is provided for the working operation, with a hydraulic working pump drivable by the drive unit and/or by the hydraulic drive support unit. The hydraulic driving circuit ensures that the machine can move forward by executing certain working processes, while the hydraulic working circuits drive the system areas to be operated in the forward moving mode or also in the stopped mode of said machine.

In particular, when the drive system according to the present invention is integrated into a soil compactor, which features at least one compacting roller and an unbalance mass arrangement assigned thereto in order to attain an optimized compacting result due to a vibratory movement and/or oscillation movement, it is proposed that the at least one hydraulic working system is provided to drive an unbalance mass arrangement provided on the compactor roller allocated to the soil compactor. Putting into operation such an unbalance mass arrangement can result in a very high request torque due to the moment of inertia to be overcome, and according to the principles of the present invention this request can be met by the total drive torque if, in conjunction with the somewhat smaller drive unit, the hydraulic drive support unit is activated in such an operating phase. Furthermore, the energy released by the inertia mass when taking out of operation an unbalance mass arrangement of this kind can be used to operate the hydraulic pump/motor assembly as a pump in the charging mode in order to increase the fluid pressure in a compressed fluid reservoir downstream from the unbalance mass arrangement.

In accordance with a particularly advantageous aspect of the present invention, it is proposed that the hydraulic pump/motor assembly in the charging mode is essentially driven by the drive unit only when the charging state of at least one of the compressed fluid reservoirs is not above a predetermined threshold charge. Thus, a charging state with the predetermined threshold charge of the pressurized fluid reservoir is ensured, regardless of whether, in addition to the drive unit, another energy becoming available in other system areas can be used as a drive power source for the hydraulic pump/motor unit for charging of the pressure reservoir. For this purpose, it can be provided that the predetermined threshold charge is a charging state with a charge in the range of 80 to 90%, preferably about 85%, of a maximum charge of the at least one pressure reservoir.

According to another further aspect of the present invention, it can be provided that when the charge state of the at least one compressed fluid reservoir is above the threshold charge, the hydraulic pump/motor assembly in the charging mode is essentially driven by means of at least one hydraulic circuit. The energy which becomes available in the course of energy recuperation can thus be used primarily to additionally charge the at least one compressed fluid reservoir to a level above the threshold charge to be provided by the drive unit, in particular until it is fully charged. This interaction of the drive unit with at least one hydraulic circuit for charging a compressed fluid reservoir, on the one hand, always ensures a sufficient charge of the compressed fluid reservoir so as to be able to use the hydraulic drive support unit to generate a drive support torque in this way, but, on the other hand, ensures that sufficient capacity is basically available in one pressure reservoir of the hydraulic drive support unit to further increase the charge in an energy recuperation process, that is, for example, to store the released energy in a deceleration process.

In order to charge a compressed fluid reservoir of the hydraulic drive support unit in the drive system according to the present invention, and again discharge it to generate a drive support torque, or if the system is to be put out of operation, to relieve a compressed fluid reservoir that has not, or not completely, been discharged, it is further proposed according to the present invention that the hydraulic drive support unit comprises a charge/discharge valve unit for optionally enabling/disabling a flow connection between the hydraulic pump/motor assembly and at least one compressed fluid reservoir at least in the flow direction from the compressed fluid reservoir to the hydraulic pump/motor assembly, and a relief valve unit for optionally enabling/disabling a flow connection between at least one compressed fluid reservoir and a fluid reservoir at least in the flow direction from the compressed fluid reservoir to the fluid reservoir.

According to an aspect of the present invention which advantageously increases the operational safety, it is proposed that the charge/discharge valve unit pre-tensioned to a basic state which interrupts the flow connection, and/or that the relief valve unit is pre-tensioned to a basic state releasing the flow connection. As a result of pre-tensioning the charge/discharge valve unit to a basic state in which the flow connection between a compressed fluid reservoir and the hydraulic pump/motor assembly is interrupted, a spontaneous discharge of the compressed fluid reservoir is prevented, for example, when excitation of this valve unit is no longer possible due to a system failure. At the same time, pre-tensioning the relief valve unit to a basic state, which produces the flow connection, ensures that in case of such a fault, the compressed fluid reservoir can empty, that is, be relieved, in the direction of the fluid reservoir.

In the drive system constructed according to the present invention the hydraulic drive support unit preferably comprises an open circuit. This means that this circuit basically has no pressure and is open toward a fluid reservoir from which the hydraulic pump/motor assembly conveys fluid for charging a compressed fluid reservoir, and into which compressed fluid released from the compressed fluid reservoir can flow back. In this connection, it is particularly advantageous if there is no fluid exchange connection between at least one fluid circuit, preferably between all fluid circuits, and the hydraulic drive support unit. This permits the configuration of these hydraulic circuits as self-contained high pressure circuits.

The drive unit in the drive system according to the present invention advantageously comprises a diesel internal combustion engine. It is characterized, firstly, by a particularly efficient fuel consumption, and, secondly, by a comparatively large drive torque.

A particularly efficient coupling between one or a plurality of hydraulic circuits and the hydraulic drive support unit can be attained in that the drive unit and the hydraulic drive support unit are, or can be, coupled parallel to each other via a transmission arrangement with at least one hydraulic circuit, preferably with a plurality of hydraulic circuits. Thus, a direct energy flow is ensured between the hydraulic circuit(s) and the hydraulic drive support unit, without any torque having to be transmitted between them via the drive unit.

The present invention further relates to a self-propelled construction machine, in particular a soil compactor, comprising a drive system having the above-described characteristics, individually or in any combination.

BRIEF DESCRIPTION OF THE DRAWING FIGURES

Figure 2:
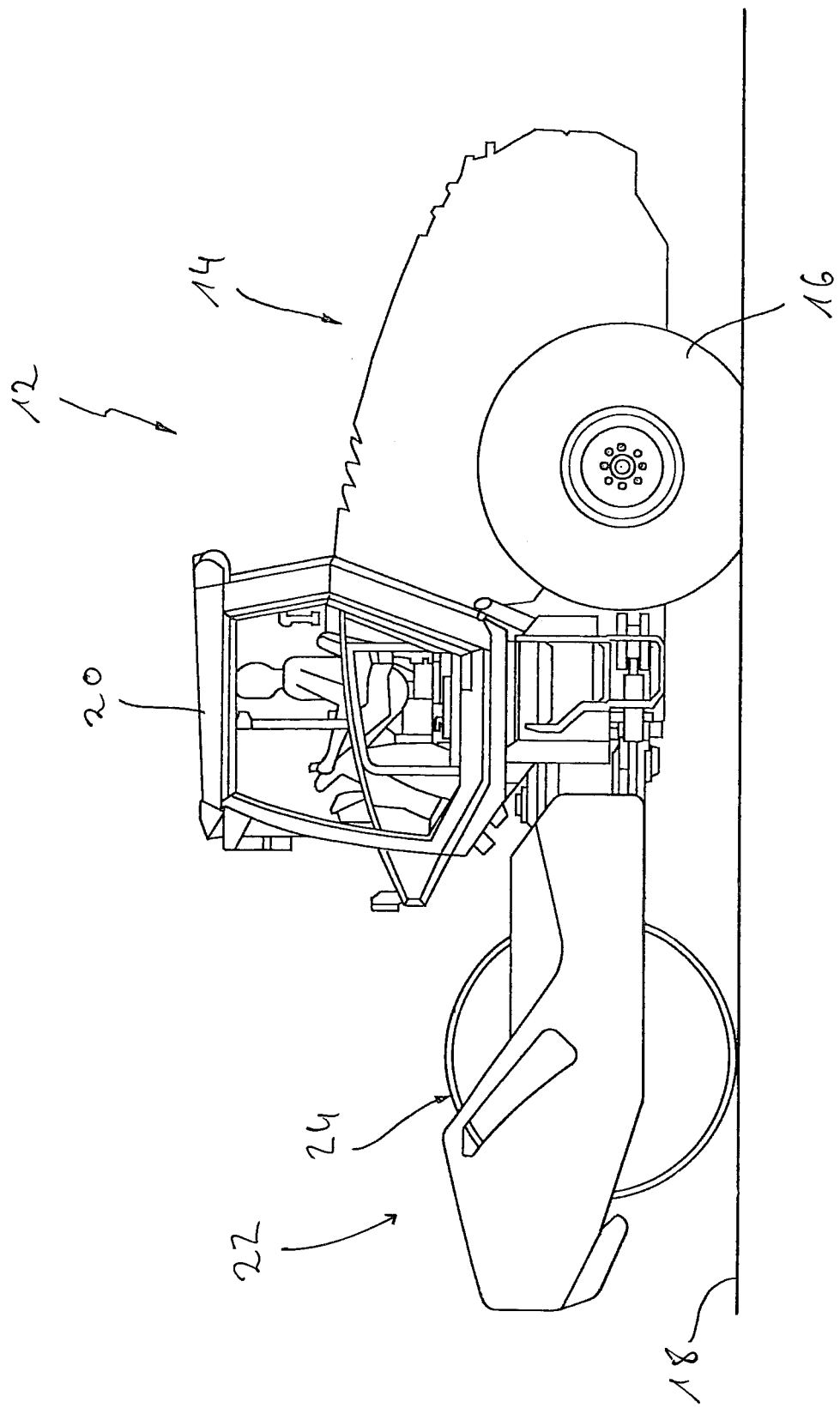

The invention will be explained in greater detail below with reference to the accompanying figures. They show:

FIG. 1 the structure of a drive system shown in principle for a self-propelled construction machine;

FIG. 2 a construction machine configured as a self-propelled soil compactor in which the drive system of FIG. 1 can be employed.

Before the drive system 10 according to the present invention is explained in detail below with reference to FIG. 1, the basic structure of a construction machine 12 will first be briefly explained with reference to FIG. 2, into which the drive system 10 of FIG. 1 can be integrated. This construction machine 10 comprises drive wheels 16 on a rear end 14 which can be driven by the drive system 10 for moving the construction machine 12 configured as a soil compactor forward on the subsoil 18 to be compacted. Furthermore, a driver's cab 20 is provided on the rear end 14 in which a person driving the construction machine 12 is accommodated, and from where the various functionalities of the construction machine 12 can be controlled.

DETAILED DESCRIPTION OF THE PREFERRED EMBODIMENTS

A compactor roller 24 is provided for driving the construction machine 12 configured as a soil compactor is connected to the front end 22 which is articulately connected to the rear end 14. With this compactor roller 24, the subsoil 18, on which the construction machine 12 moves, is compacted. In order to carry out this compacting process in a defined manner, the compactor roller 24 can have an unbalance mass arrangement, which can be accommodated, for example, in the interior of the compactor roller 24 and can be put into operation in order to generate a vibratory movement, that is, a periodic up and down movement of the compactor roller 24, and/or to generate an oscillating movement, that is, a back and forth movement of the compactor roller 24 in the circumferential direction. For this purpose, the drive system 10 represented in FIG. 1 can also be used, as will be explained below.

It should be pointed out that in FIG. 2 the construction machine 12 represented in the form of a soil compactor is illustrated only in its essential aspects and only as an example of a machine in which the drive system 10 of FIG. 1 can be used. For example, in the case of an arrangement as a soil compactor, the machine could be configured with an additional compactor roller driven by the drive system 10 of FIG. 1 to advance the soil compactor instead of the drive wheels 16. The construction machine 12 could also be configured in the form of a wheeled loader, a caterpillar bulldozer, an excavator or the like.

The drive system 10 of FIG. 1 comprises a drive unit 26 configured for example as a diesel internal combustion engine as a primary energy source. This drive unit 26 is, or can be, drivingly connected, for example via a clutch arrangement, a hydrodynamic torque converter or the like to a transmission arrangement 28. The drive torque provided by the drive unit 26 can be transmitted or distributed to various system areas via the transmission arrangement 28.

One of these system areas comprises a hydraulic driving circuit 30 with a hydraulic driving pump 32 integrated therein. Said pump can be permanently coupled to the transmission arrangement 28 or can be coupled for example, via a clutch arrangement to the transmission arrangement 28. When operating, the hydraulic driving pump 32 recirculates fluid, e.g. hydraulic oil, in the hydraulic driving circuit 30 in order to drive one or possibly a plurality of hydraulic driving motors, not illustrated in FIG. 1, so that a torque can be transmitted, for example, to the drive wheels 16 of the construction machine 12. It should be pointed out in this connection that a stand-alone and independently operating hydraulic driving circuit can be provided to each drive wheel 16, or, for example, be allocated to each crawler of a construction machine.

An additional hydraulic circuit, namely a hydraulic working circuit is designated with reference numeral 34. This circuit also comprises a hydraulic pump, in this case a hydraulic working pump 36. This hydraulic working pump 36 can also be permanently coupled to the transmission arrangement 28, or to the transmission arrangement 28 via a clutch. During operation, the hydraulic working pump 36 generates a fluid recirculation, e.g. of hydraulic oil, in the hydraulic working circuit 34. One or more hydraulic working motors can be provided in the hydraulic working circuit 34 by which, for example, the unbalance mass arrangement can be driven in the compactor roller 24.

It should be pointed out that the hydraulic pumps 32, 36 can preferably be configured with a variable flow, for example, as wobble plate pumps, in order to accordingly adjust the fluid recirculation in the hydraulic circuits 30, 34 configured as high pressure circuits, and thus also the torque transmissible therein.

The drive system 10 further comprises a hydraulic drive support unit generally designated with reference numeral 38. This unit comprises a hydraulic pump/motor assembly 40, which can be permanently coupled to the transmission 28, or is, or can be, coupled to the transmission arrangement 28 by means of a clutch, and in this manner drivingly connected to the transmission arrangement 28 and thereby connected to the drive unit 26 or to the hydraulic circuits 30, 34, especially to their hydraulic pumps 32, 36. The hydraulic pump/motor assembly 40 can be switched between an operating mode in which it is drivable as a pump, and an operating mode in which it is drivable as a motor. This assembly is advantageously also configured as a wobble plate unit.

In FIG. 1 one can see that the hydraulic drive support unit 38 and the drive unit 26 are, or can be, coupled in parallel to the various hydraulic circuits 30, 34 via the transmission arrangement 28. Thus a direct torque exchange is possible, for example between the drive unit 26 and the hydraulic circuits 30, 34, and also a direct torque exchange between the hydraulic drive support unit 38 and the hydraulic circuits 30, 34, as will be explained in detail below.

The hydraulic drive support unit 38 further comprises a compressed fluid reservoir 42 which can be charged by operating the hydraulic pump/motor assembly 40 as a pump. To do so, the hydraulic pump/motor assembly 40 can convey fluid, e.g. hydraulic oil, from a preferably non-pressurized fluid reservoir 44, in the direction of the compressed fluid reservoir 42.

A charge/discharge valve unit 48 is arranged in a line 46 leading from the hydraulic pump/motor assembly 40 to the compressed fluid reservoir 42. This charge/discharge valve unit 48 is adjustable, for example, by electrical excitation and is pre-tensioned by a pre-tensioning spring or the like to the basic state shown in FIG. 1, in which state it interrupts the flow connection between the hydraulic pump/motor assembly 40 and the compressed fluid reservoir 42. In this case, the charge/discharge valve unit 48 can be configured such that it functions as a non-return valve in this state, which, although it permits a fluid flow from the hydraulic pump/motor assembly 40 to the compressed fluid reservoir 42, it prevents a fluid flow in the reverse direction. For example, it is brought into its release state in which the flow connection between the compressed fluid reservoir 42 and the hydraulic pump/motor assembly 40 is released by means of electrical excitation of the charge/discharge valve unit 48.

A line 52 leading to the fluid reservoir 44 branches from the section 50 of the line 46 located between the compressed fluid reservoir 42 and the charge/discharge valve unit 48. This line 52 basically establishes a connection between the compressed fluid reservoir 42 and the fluid reservoir 44. Three valve units 54, 56, 58 are arranged in parallel to each other in the line 52. The valve unit 54 is, for example, an electrically excited relief valve unit 54 which is pre-tensioned to a basic state, for example, by an initial spring tension, in which it releases the flow connection between the compressed fluid reservoir 42 and the fluid reservoir 44. On activation of the relief valve unit 54, for example, by electrical excitation, said valve is switched into its state which interrupts the flow connection between the compressed fluid reservoir 42 and the fluid reservoir 44. In this case, the relief valve unit 54 can be configured such that, in this state, it functions as a non-return valve which fundamentally allows a flow of fluid from the fluid reservoir 44 in the direction of the compressed fluid reservoir 42, but prevents a fluid flow in the reverse direction.

Parallel to the relief valve unit 54 there is a manual relief valve unit 56. By operating it manually, this valve can be set into its state in which it releases the flow connection between the compressed fluid reservoir 42 and the fluid reservoir 44.

An overload valve unit 58 is arranged in the line 52 in parallel to the valve units 54, 56, which, when the fluid pressure in the compressed fluid reservoir 42, or in section 50 of the line 48 exceeds a predetermined, limiting pressure, said overload valve permits a relief of the compressed fluid reservoir 42 to the fluid reservoir 44. It can for example be provided that in case of a maximum charge, a fluid pressure of about 300 bar should prevail in the compressed fluid reservoir 42. Given a design of this kind, the overload valve unit 58 can be dimensioned such that at a pressure exceeding 300 bar in the compressed fluid reservoir 42, it establishes a flow connection between the compressed fluid reservoir 42 and the fluid reservoir 44 until the fluid pressure in the compressed fluid reservoir 42 has again fallen below this limit value.

The hydraulic drive support unit 38 furthermore comprises a recirculating valve unit 60. This unit is arranged in the flow path between the hydraulic pump/motor assembly 40 and the fluid reservoir 44 and branches off from a section 62 of the line 46 located between the hydraulic pump/motor assembly 40 and the charge/discharge valve unit 48. The recirculating valve unit 60 is basically pre-tensioned to a state in which there is a flow connection between the hydraulic pump/motor assembly 40 and the fluid reservoir 44. By means of electrical excitation, for example, this recirculating valve unit 60 can be brought into a state in which this flow connection is interrupted.

In this state, the recirculating valve unit 60 will operate as a check valve which prevents a flow from the hydraulic pump/motor assembly 40 to the fluid reservoir 44, but will allow a flow in the other direction.

When the charge/discharge valve unit 48 is in the closed position, the recirculating valve unit 60 can be used to establish a flow connection between the hydraulic pump/motor assembly 40 and the fluid reservoir 44, when a fluid should recirculate from the fluid reservoir 44 and back into the fluid reservoir 44, but without further charging the compressed fluid reservoir 42. This can be advantageous in order to maintain a minimum fluid flow through the hydraulic pump/motor assembly 40 to dissipate the heat generated in the region of this assembly.

Furthermore, an overload valve unit 64 is arranged in parallel to the recirculating valve unit 60, which can be dimensioned such that it enables a flow connection to the fluid reservoir 44 in the event of a limiting pressure above the maximum charge pressure, for example a limiting pressure of about 330 bar, in order to thus prevent an excessive pressure build-up, especially in the region of the line 46.

Furthermore a non-return valve 66 is arranged in parallel to the recirculating valve unit 60 and the overload valve unit 64. Said non-return valve is switched such that it permits a flow from the fluid reservoir 44 into the line 46, in particular into the section 62 thereof, but prevents a flow in the other direction in order to thus prevent the generation of an under-pressure in the region of the line 46.

Flow throttle units 68, 70, 72 are allocated to all valve units to be adjusted either by electrical excitation or by manual operation and which release a flow path to the fluid reservoir 44, that is, the relief valve unit 54, the manual relief valve unit 56 and the recirculating valve unit 60. Said throttle units throttle the fluid flow to the fluid reservoir 44, in particular when there are very high pressure differences between the compressed fluid reservoir 42 and the fluid reservoir 44.

In the drive system 10 described above there is no fluid exchange connection between the hydraulic drive support unit 38 and the hydraulic circuits 30, 34 required for the operation of the construction machine 10. The hydraulic drive support unit 38 is exclusively drivingly connected to the hydraulic circuits 30, 34, that is, mechanically coupled, namely via the transmission arrangement 28. This allows a design of the hydraulic drive support unit 38 as an open circuit, that is, as a low-pressure circuit, whereas the hydraulic circuits 30, 34 can be configured as closed hydraulic circuits, that is, as high pressure circuits.

The drive system 10 represented in FIG. 1 can be operated in various operating modes. FIG. 1 shows a state in which the hydraulic drive support unit 38 is switched so that the compressed fluid reservoir 42 is connected to the fluid reservoir 44, that is, a pressure built up therein can be relieved, or no pressure can be built up. This is a state which can be assumed when the drive system 10 is out of operation.

If the drive system 10 is to be operated, for example, in order to move forward the soil compactor shown in FIG. 2, so as to compact the subsoil 18 by utilizing the vibratory and/or oscillation movements of the compactor roller 24, the charge/discharge valve unit 48 will be excited so that it is in the state in which it creates a connection between the compressed fluid reservoir 42 and the hydraulic pump/motor assembly 40. At the same time, the relief valve unit 54 and the recirculating valve unit 60 are triggered or excited so as to bring them into their closed state. In this state, the drive unit 26 can drive the two hydraulic pumps 32, 36 via the transmission arrangement 28 for driving the traction drive and the drive of the unbalance mass arrangement. Furthermore, the hydraulic pump/motor assembly 40 is driven so that it operates as a pump and conveys fluid from the fluid reservoir 44 to the compressed fluid reservoir 42. This state can be maintained until the compressed fluid reservoir 42 has reached a threshold charge which can be, for example, 85% of the maximum charge. At a maximum charge pressure of about 300 bar this threshold charge can thus correspond to a charge pressure of about 255 bar.

Once this state has been reached, the hydraulic pump/motor assembly 44 can continue in operation as a pump, even though at a reduced output in order to compensate for any leakage losses from the compressed fluid reservoir 42 via the shut-off valves arranged, in particular, in the direction of the fluid reservoir 44, and in this way ensure that a pressure can be maintained which roughly corresponds to the threshold charge.

If energy is released during the operation of the construction machine 12, for example, because it should be decelerated, or if the operation of the unbalance mass arrangement is to be stopped, the torque transmission direction is reversed in the hydraulic circuits 30, 34, so that the hydraulic pumps 32, 36, driven by a fluid flow generated by the respective hydraulic motors, which are not shown, temporarily function as motors and apply a torque to the transmission arrangement 28. This torque can be applied via the transmission arrangement 28 to the hydraulic pump/motor assembly 40, which can then be used again as a pump in order to further increase the pressure in the compressed fluid reservoir 42, for example, until the maximum charge pressure has been reached. To do so, the hydraulic pump/motor assembly 40 is set to an increased output, so that the necessary or desired pressure build-up in the compressed fluid reservoir 42 is reached. This process can be continued or repeated until the maximum charge of the compressed fluid reservoir 42 has been reached, that is, until the maximum charge pressure of 300 bar, for example, has been reached. If this is the case, the hydraulic pump/motor assembly 40 can be set back to a lower output or flow rate in order to ensure that the pressure increased to the maximum charge pressure by using at least one energy recuperation process can be maintained in the compressed fluid reservoir 42.

It should be pointed out that this energy recuperation mode can also be used for additionally charging the compressed fluid reservoir 42, when the energy can be recuperated from only one of the two hydraulic circuits 30, 34. Furthermore, in this state, the drive unit 26 can also be used to apply an additional torque to the transmission arrangement 28, in particular when switching over to an energy recuperation mode is possible but the compressed fluid reservoir 42 has not yet attained the state of the threshold charge of, for example, about 85% of the maximum charge.

In particular, in the energy recuperation mode, it is especially advantageous that there is a direct connection between the hydraulic circuits 30, 34 and the hydraulic drive support unit 38 via the transmission arrangement 28, so that the energy released in the energy recuperation mode can be directed, for example, to the hydraulic drive support unit 38 via the drive unit 26.

If there is a large request torque in the region of one or both hydraulic circuits 30, 34, for example, because the construction machine 12 has to overcome a comparatively steep gradient or has to be moved over a curbstone edge or any other obstacle, the energy stored in the compressed fluid reservoir 42 can be used to apply a drive support torque to the transmission arrangement 28, when operating the hydraulic pump/motor assembly 40 as a motor, and to direct this torque via the transmission arrangement 28 to one or to both hydraulic circuits 30, 40, that is, for additionally driving the respective hydraulic pump 32 or 36. In this state, for example, the drive unit 26 can also be operated to supply the maximum drive torque that can be provided, so that a total drive torque is directed via the transmission arrangement 28 to the hydraulic circuits 30, 34, said torque being composed of the drive torque of the drive unit 26, for example, the maximum drive torque thereof, and of the drive support torque of the hydraulic drive support unit 38. In order to reach this state, the charge/discharge valve unit 48 is switched to its release state so that the compressed fluid reservoir 42 can drain via the hydraulic pump/motor assembly 40 in the direction of the fluid reservoir 44. The torque that can be provided in this drive support operating mode by the hydraulic drive support unit 38 can be varied by correspondingly adjusting the hydraulic pump/motor assembly 40 when the motor is operated.

The configuration of the drive system 10 allows a design of the drive unit 26 with respect to the maximum drive torque it can provide, such that this maximum drive torque is smaller than a maximum request torque during the operation of the construction machine 12. Since the hydraulic drive support unit 38 can provide the drive support torque in states in which there is such a request torque, it is possible to apply a total drive torque to the hydraulic circuits 30, 34 which corresponds to the request torque in order to thus be able to operate the construction machine 12 in an appropriate manner.

As a result of this design of the drive unit 26 with a comparatively small maximum drive torque, efficient energy utilization is ensured with an in general smaller size, in which, in particular, also the energy released in various states of the construction machine 12 can be used to charge the compressed fluid reservoir 42.

It should be pointed out that the drive system shown in FIG. 1 can be varied in many different ways, especially with respect to the configuration of the hydraulic drive support unit. For example, several, for example, compressed fluid reservoirs connected in parallel can, obviously, be provided. The various valves or valve units can also each be configured as separate assemblies interconnected by lines, or can be integrated into a valve block, which contributes to a compact configuration, and nevertheless operates with a high operating safety.

Furthermore, the various hydraulic pumps as well as the hydraulic pump/motor assembly for example, can be permanently coupled to the transmission arrangement 28, that is, not via the clutch units or the like which interrupt the flow of torque. As a result of the adjustment of these pumps or assemblies, configured for example as wobble plate units, the request torque and/or fluid feed rate or output can be varied. If a particular hydraulic circuit and/or the hydraulic drive support unit is not to be operated, then the hydraulic pumps and/or the hydraulic pump/motor assembly can be switched to a neutral state.

The invention claimed is:
1. A drive system for a self-propelled construction machine, comprising:
    a drive unit,
    at least one hydraulic circuit with a hydraulic pump drivable by the drive unit,
    a hydraulic drive support unit with a hydraulic pump/motor assembly and at least one compressed fluid reservoir, wherein the hydraulic pump/motor assembly is, or can be, drivingly connected to the drive unit and/or to at least one hydraulic circuit, wherein the hydraulic pump/motor assembly is drivable in a charging operating mode as a pump by means of the drive unit and/or by means of at least one hydraulic circuit for charging at least one compressed fluid reservoir, and in a drive support state is drivable as a motor to provide a drive support torque for the hydraulic pump of at least one hydraulic circuit,
    wherein a maximum drive torque provided by the drive unit is smaller than a maximum request torque to be applied for operating at least one hydraulic circuit,
    wherein the hydraulic pump/motor assembly in the charging operating mode is only essentially driven by the drive unit operated for driving at least one hydraulic circuit when the charge state of at least one of the compressed fluid reservoirs is not above a predetermined threshold charge.

2. The drive system according to claim 1, wherein a maximum total drive torque that can be provided by the maximum drive torque and a maximum drive support torque generated by the hydraulic drive support unit is larger than or equal to the maximum request torque.

3. The drive system according to claim 1, wherein at least one hydraulic circuit is provided as a hydraulic driving circuit for the traction drive with a hydraulic driving pump drivable by the drive unit and/or by the hydraulic drive support unit.

4. The drive system according to claim 3, wherein at least one hydraulic working circuit is provided to drive an unbalance mass arrangement provided on the compactor roller allocated to the soil compactor.

5. The drive system according to claim 1, wherein at least one hydraulic working circuit is provided for the working mode with a hydraulic working pump drivable by the drive unit and/or by the hydraulic drive support unit.

6. The drive system according to claim 5, wherein at least one hydraulic working circuit is provided to drive an unbalance mass arrangement provided on the compactor roller allocated to the soil compactor.

7. The drive system according to claim 1, wherein the predetermined threshold charge is a charge state with a charge in the range of 80 to 90% of a maximum charge of the at least one pressure reservoir.

8. The drive system according to claim 1, wherein when the charge state of the at least one compressed fluid reservoir is above the threshold charge, the hydraulic pump/motor assembly in the charge operating mode is essentially driven by means of at least one hydraulic circuit.

9. The drive system according to claim 1, wherein the hydraulic drive support unit comprises a charge/discharge valve unit for optionally enabling/disabling a flow connection between the hydraulic pump/motor assembly and at least one compressed fluid reservoir at least in the flow direction from the compressed fluid reservoir to the hydraulic pump/motor assembly and comprises a relief valve unit for optionally enabling/disabling a flow connection between at least one compressed fluid reservoir and a fluid reservoir, at least in the flow direction from the compressed fluid reservoir to the fluid reservoir.

10. The drive system according to claim 9, wherein the charge/discharge valve unit is pre-tensioned to a basic state which interrupts the flow connection, and/or that the relief valve unit is pre-tensioned to a basic state releasing the flow connection.

11. The drive system according to claim 1, wherein the hydraulic drive support unit comprises an open circuit.

12. The drive system according to claim 1, wherein there is no fluid exchange connection between at least one fluid circuit and the hydraulic drive support unit.

13. The drive system according to claim 1, wherein the drive unit comprises a diesel internal combustion engine.

14. The drive system according to claim 1, wherein the drive unit and the hydraulic drive support unit are, or can be, coupled parallel to each other via a transmission arrangement with at least one hydraulic circuit.

15. A self-propelled construction machine, comprising a drive system according to claim 1.

16. The drive system according to claim 1, wherein the predetermined threshold charge is a charge state about 85% of a maximum charge of the at least one pressure reservoir.

17. The drive system according to claim 1, wherein there is no fluid exchange connection between all fluid circuits and the hydraulic drive support unit.

18. The drive system according to claim 1, wherein the drive unit and the hydraulic drive support unit are coupled parallel to each other via a transmission arrangement with a plurality of hydraulic circuits.

* * * * *